Oct. 18, 1966
W. G. LAMBERT
3,279,155
MEANS FOR SEPARATING PARTICLES OF HIGH DENSITY
FROM FLUID OF LOW DENSITY
Filed Dec. 10, 1962
2 Sheets-Sheet 1
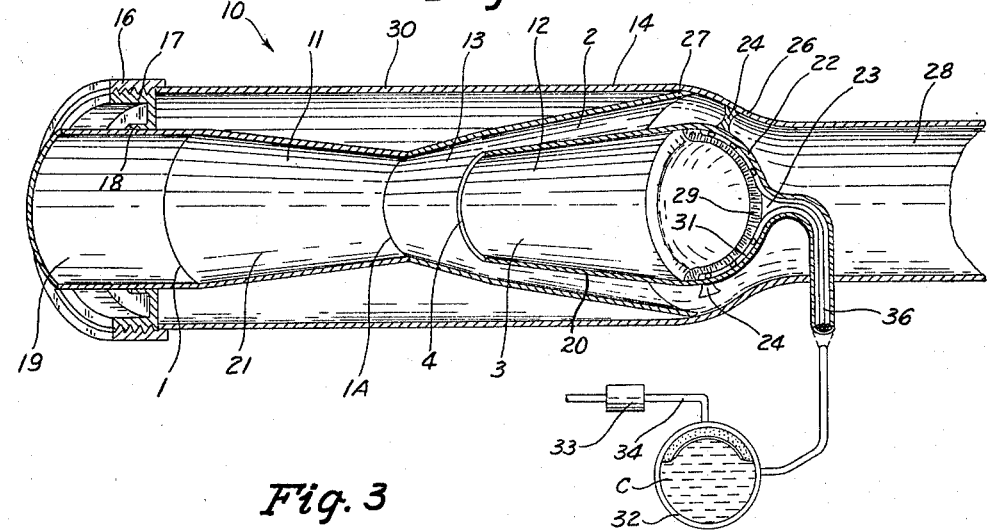
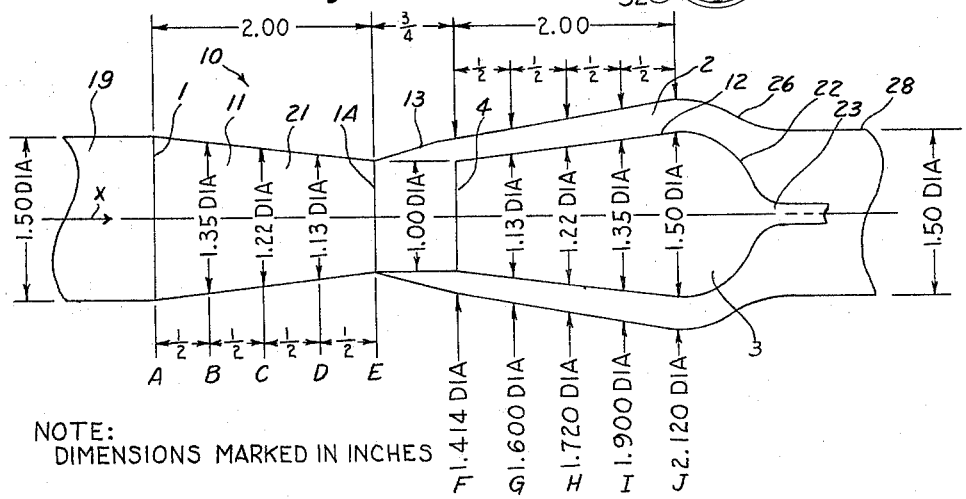
NOTE:
DIMENSIONS MARKED IN INCHES
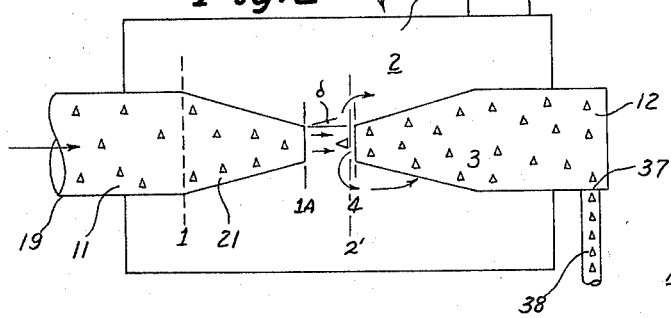
INVENTOR
WARREN G. LAMBERT
BY
Dick, Zarley & Henderson
ATTORNEYS INVENTOR
WARREN G. LAMBERT
BY
Dick, Zarley & Henderson
ATTORNEYS 3,279,155
MEANS FOR SEPARATING PARTICLES OF HIGH
DENSITY FROM FLUID OF LOW DENSITY
Warren G. Lambert, 634 16th St., Ames, Iowa
Filed Dec. 10, 1962, Ser. No. 243,280
4 Claims. (Cl. 55—218)

This invention pertains to the separation of particles of relatively high density from a fluid of low density and the particular embodiment herein is related to the separation of water condensate from a stream of air.

The invention deals with a separator design usable in both an earth environment and in a weightless environment. The separation of condensate has always been a problem. Condensate in a steam line may produce a water hammer which could result in severe vibration, leaks and possible rupture of the piping system. High speed turbines may be severely damaged if condensate is carried into the blades.

In order to reduce such damage, steam traps and centrifugal type separators are installed in the steam lines. The main disadvantage of centrifugal separators is the large pressure drop which is associated with this type separator and the resultant horsepower penalty. In the current attempt to remove condensate from an air stream in a non-gravity or weightless environment, a system utilizing a sponge material has been tried. The air stream is passed through the sponge, the sponge is then manually, or automatically as the case may be, compressed at intervals to remove the water from the system. The water is then directed to a water reservoir.

The two main objections to the use of a sponge system are a fairly large pressure drop to the air stream reflected in air horsepower and system power-weight penalty. Also, the operation is cyclic as compared to the advantageous continuous, and this imposes a certain power load upon the system. Additionally, the ability of the sponge material to entrain and retain moisture in a moderate velocity gas stream, in a zero-G environment, is questionable.

It is an object, therefore, of this invention to provide a novel apparatus for separating particles of relatively high density, such as condensate, from a fluid, such as air or steam vapor, of a low density.

It is another object of this invention to provide such an apparatus which is operable at both earth environment and at zero-G environment.

Another object of this invention is to provide such an apparatus having a uniform and low pressure drop minimizing thereby the power-weight penalty due to air horsepower.

Yet another object of this invention is to provide such an apparatus which has no moving parts per se, achieving thereby mechanical simplicity of the highest degree.

Still another object of this invention is to provide such an apparatus wherein the function of water separation from the air stream is continuous at all latent heat loads.

It is another object of this invention to provide a particular embodiment of such an apparatus for use in an earth environment, and to provide a particular embodiment thereof for use in a weightless environment.

These objects, and other features and advantages of this invention will become readily apparent from the following description when taken into consideration with the accompanying drawings, wherein:

FIG. 1 s a cross-sectional view taken slightly in perspective of one embodiment of this invention for use in a weightless environment;

FIG. 2 is a rough design of the separator for calculation purposes and showing a modified arrangement for dispersing the collected condensate in an earth environment;

FIG. 3 is a diagrammatic outline of the separator structure of FIG. 1, showing calculated dimensions therefor;

Figure 4:
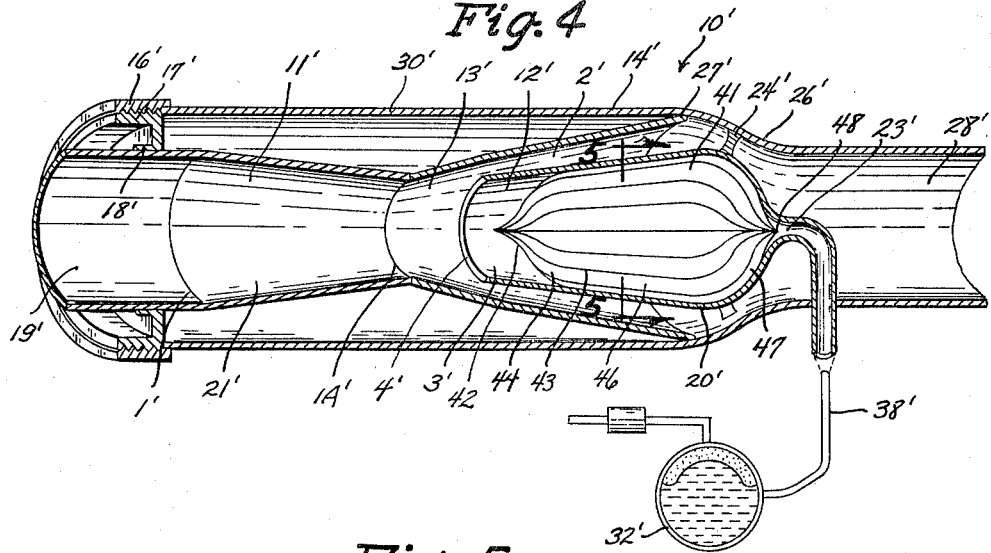
FIG. 4 is a view similar to FIG. 1 showing another modified arrangement of the separator.

Referring now to the drawings, the separator is indicated generally at 10 in FIG. 1 and comprises a pair of opposing nozzles 11 and 12 and a diffuser section 13, all encased in a cylindrical housing 14 having a collar unit 16 at one end thereof. The inner, externally threaded member 17 of the collar unit 16 has a central opening defined by a circular flange 18 for supporting the nozzle 11. The nozzle 11 is tubular, includes a constant diameter section 19 of indeterminate length, and includes further a section 21 of a progressively decreasing diameter as it extends away from the inner end 1 of section 19, or inwardly of the separator 10, ending at the outlet opening 1A. This is the inlet nozzle 11 and serves in the ordinary sense of a nozzle in that the gas or vapor along with the entrained particles to be separated are accelerated to a higher velocity as they pass through the inlet nozzle 11.

The opposite nozzle 12 (FIG. 1) is the collection chamber nozzle and the interior of which serves as a collecting chamber 3. The chamber nozzle 12 is also tubular and has a section 20 of a progressively increasing diameter as the section 20 extends away from the inlet opening 4, which has substantially the same diameter as the outlet opening 1A. The rear or inner end 22 of the chamber nozzle 12 is semi-circularly rounded on its interior surface and is open at its center 23 for a purpose hereinafter described. It will be noted that the chamber nozzle 12 is held in place by a plurality of arcuately spaced supports 24 (FIG. 1) connected between a section 26 of the housing 14 and the nozzle 12. By this arrangement, the chamber nozzle 12 is suspended concentrically within the diffuser section 13 as illustrated in FIG. 1, and is maintained in axial alignment with the inlet nozzle 11.

The diffuser section 13 comprises a cylindrical frustoconical wall connected by a mating relation with the inner discharge end 1A of the inlet nozzle 11, and which has a progressively increasing diameter as it extends away from the end 1A in a concentric relation with the longitudinal axis of the separator 10. At its downstream end 27, the diffuser 13 engages and is secured to the inner surface of the housing 14. Thus, an annular diffuser chamber 2 is formed between the diffuser section 13 and the chamber nozzle section 20, and between the outlet 1A and the inlet 4. Both nozzles 11 and 12 also are disposed in concentric relation with the longitudinal axis of the separator 10. The rear or downstream end section 28 of the housing 14 is slightly smaller in diameter than the main section 30 thereof, and is of an indeterminate length.

As described thus far, the entire apparatus, which involves no moving parts and which is not moved itself to effect operation thereof is sufficient to separate particles of relatively high density, such as water condensate from a fluid of low density such as a stream of air, steam or the like. To provide a complete system for environmental control purposes, for example, requires a cooperative co-action of the separator 10, per se, with apparatus for expelling or withdrawing the condensate collected in the chamber 3.

A preferred form of this apparatus for use in a weightless or zero-G environment, is illustrated in FIG. 1 and comprises a round, originally flat fibrous felt pad 29 adapted to be affixed to the interior surface of the chamber nozzle rear end 22. This pad 29 provides the type of large surface area required so that the surface tension property of the condensate will cause it first to collect on the felt pad 29, second to wet the pad, and then to displace the atmosphere from the pad interstices.

A capillary tube network 31 is randomly positioned between the pad 29 and the rear end 22 surface and is adapted to receive the condensate collected within the interstices and to transmit the condensate C (FIG. 1) to a reservoir 32. To assure a fluid flow to the reservoir in a weightless environment, a pressure regulator 33 and a conduit 34 leading therethrough to the reservoir 32 maintains the pressure within the reservoir one to two p.s.i. below the separator stagnation pressure within the chamber nozzle 12.

Although not shown herein an electrolytic switch could be located within the pad 29 to operate to open a normally closed valve (not shown) in the tube lines 36 when there is sufficient wetness in the pad to assure liquid supply to the capillary tube network 31. Thus, no ventilating gas would escape from the separator system.

Where the separator 10 is used only in an earth environment, the felt pad arrangement would not be necessary. The water rejection would be accomplished merely by supplanting the outer opening 23 with a bottom opening 37 (FIG. 2) in the chamber nozzle 12. Thus, the condensate collected in the chamber 3 would have a gravitational flow through a depending conduit 38 to a reservoir, such as 32.

In operation of the separator 10, tests have proven that upon the passage of wet steam into the inlet nozzle 11 (FIG. 2), the wet steam undergoes a decrease in pressure and an increase in velocity as it progresses along the axes of the nozzle 11. Furthermore, the kinetic energy of the wet steam increases as it progresses. With the collecting chamber 3 a short distance from the inlet nozzle outlet 1A, axially aligned with the nozzle 11 and with the diameter of the outlet 1A substantially identical to the diameter of the chamber nozzle inlet 4, flow of the wet steam cannot occur through the collecting chamber 3 when the condensate conduit 38 is closed, except possibly when the condensate is being drained off.

Therefore, the vapor portion of the wet steam issuing from the inlet nozzle outlet 1A (FIG. 2) cannot enter the collecting chamber 3 due to stagnant vapor remaining at a static condition within the chamber 3. The pressure $P_3$ of the stagnant vapor times the outlet nozzle inlet area $A_4$ is thus the force which diverts the mass of vapor trying to enter the collecting chamber 3. The product of $P_3 A_4$ must be equal to the mass flow rate of vapor which is diverted, times the net change of vapor velocity in the direction of flow, through the inlet nozzle 11 toward the outlet nozzle 12, as the vapor is diverted past the chamber nozzle inlet 4.

The momentum and kinetic energy of the condensate per unit volume is greater than the momentum and kinetic energy of the vapor unit volume due to the difference in densities, and the pressure $P_3$ acting on a unit volume of condensate is not enough to divert the condensate as it does the vapor. Thus, the condensate enters the collecting chamber 3 while the vapor is diverted around the collecting chamber 3.

FIG. 3 illustrates a design and dimensions therefor of the inertia separator 10 for removing condensate from an environmental loop in which three men are located. Hereinafter is a design analysis of the separator 10 based on the following parameters assumed for the separator at the inlet 1 to the nozzle section 21: (a) 36 c.f.m. of $O_2$ saturated with water vapor at a pressure of 5.00 p.s.i.a. and 45° F.; and (b) .0242 lbs. of condensate per minute, based upon 3 men in suits, parallel arrangement. This corresponds to a 500 B.t.u./hr. latent heat load per man.

*Table of symbols*

$A$ = Area
$d$ = Diameter
$g$ = Universal constant
$k$ = Isentropic expansion exponent
$M$ = Mach number

*Table of symbols*—Continued $P$ = Pressure
$Q$ = Flow rate
$R$ = Gas constant
$T$ = Temperature
$V$ = Velocity
$\delta$ = Divergence angle of jet
$o$ = refers to stagnation states
$*$ = refers to Mach 1 states
$AV = Q$
$Q$ = 36 c.f.m.
$A$ = Cross section area, ft.²
$V$ = Velocity, ft./min.

Assume:
$A_1 = 1.7670$ in.²
$d_1 = 1.50$ in.
$AV = 36$ $$V_1 = \frac{(36)}{(60)} \frac{(144)}{(1.7670)} = 48.5 \text{ ft./sec.}$$

The Mach number at 1 is:

$$M \frac{V_1}{\sqrt{kgRT}}$$

$$M_1 = \frac{48.5}{\sqrt{(1.395)(32.2)(48)(505)}} = \frac{48.5}{1020} = .0475$$

$M_1 \approx .05$
$A_1 = 1.7670$ in.²
$d_1 = 1.50$ in.

$$\frac{A_1}{A^*} = 11.592$$

$$\frac{P_1}{P_0} = .99825$$

$$\frac{\rho}{\rho_0} = .99875$$

$$\frac{T}{T_0} = .99950$$

Where $P_0 = 5$ p.s.i.a.
$T_0 \cong 505$ *R

Calculations proved that the efficiency of separation is dependent partly upon the angle $\delta$ (FIG. 2) of divergence of the flow of the fluid as it exits from the outlet 1A, and that upon reducing the angle to zero the highest efficiency is attainable. It was ascertained that the optimum pressure ratio $P_{1A}/P_1$ which reduces the divergence angle $\delta$ to zero should be equal to, or greater than, the critical pressure ratio for the particular gas flowing. Since the gas flow is $O_2$ in our case, the critical pressure ratio is $$\frac{P_o}{P_0} = .52828$$

hence for this design, $$\frac{P_{1A}}{P_1} = \frac{P_2}{P_1} \geq .52828$$

Assume:

$M_{1A} = .10$ $$\frac{P_{1A}}{P_0} = .99303$$

$P_{1A} = (5)(.99303) = 4.96515$
$5.00000 - 4.96515 = 0.03485$ #/in.² = $\Delta P$ Now 5.25 #/ft.² pressure drop is equal to 1 inch of $H_2O$ as, $$\frac{5.25}{144} = .0365 \text{#/in.}^2/\text{in. of } H_2O$$

hence in terms of pressure drop, inches of water.

$$\frac{.03485 \#/\text{in.}^2}{.03650 \#/\text{in.}^2/\text{in. of H}_2\text{O}} = .95 \text{ in. of H}_2\text{O} = \Delta P$$

$M_{1A} = .10$ is O. K.

Sizing the exit area and diameter.
For $$M_{1A} = .10$$

$$\frac{A_{1A}}{A^*} = 5.8218$$

$$\frac{T}{T_0} = .99800$$

Now:

$$\frac{A_1}{A^*} = 11.592$$

Hence, $$\frac{\frac{A_1}{A^*}}{\frac{A_{1A}}{A^*}} = \frac{11.592}{5.8218}$$

$$\frac{A_1}{A_{1A}} = 1.98$$

$$A_1 = 1.7670 \text{ in.}^2$$
$$A_{1A} = .88 \text{ in.}^2$$
$$d_{1A} = 1.02 \text{ in.}$$

The exit velocity $V_{1A}$ is:

$$V_{1A} = (.1)\sqrt{(1.4)(32.2)(48)(.998)(505)}$$
$$V_{1A} = 101 \text{ ft./sec.}$$

Sizing the inlet nozzle 11 over its entire length of two inches is calculated as follows, assuming:

Cross section A Mach .0500
Cross section B Mach .0625
Cross section C Mach .0750
Cross section D Mach .0875
Cross section E Mach .1000

Since, over the range of Mach numbers being considered, the temperature and density ratios are approximately .99, the volumetric flow rate remains very close to 36 c.f.m. at each cross section of the nozzle section 21, hence:

$$.7854 d^2 V = \frac{36}{60}$$

$$V = M\sqrt{kgRT}$$

$$.7854 d^2 M \sqrt{kgRT} = \frac{36}{60}$$

or:

$$\frac{(.7854 d^2 M \sqrt{kgRT})_x}{(.7854 d^2 M \sqrt{kgRT})_1} = 1$$

$$\frac{d_x^2 M_x}{d_A^2 M_A} = 1$$

$$d_x^2 = \frac{M_A}{M_x} d_A^2$$

$$d_B^2 = \left(\frac{.0500}{.0625}\right)(2.25) = 1.82$$

$$d_B = 1.35''$$

$$d_C^2 = \left(\frac{.0500}{.0750}\right)(2.25) = 1.50$$

$$d_C = 1.22''$$

$$d_D^2 = \left(\frac{.0500}{.0875}\right)(2.25) = 1.29$$

$$d_D = 1.135''$$

$$d_E^2 = \frac{(.0500)}{(.1000)}(2.25) = 1.12''$$

$d_E = 1.05''$ rounded off for practical purposes to $1.00''$.

Following are the calculations for the diffuser section 13, the dimensions of the chamber nozzle section 20 being identical to those of the inlet nozzle section 21 as the section 20 extends rearwardly of the inlet 4 and up to the diameter of 1.50'' which is equivalent to the diameter 1.50'' at the cross section 1 in the inlet nozzle 11.

$$.7854 d_F^2 - .7854 (d_E)^2 = .7854 (d_E)^2$$

$$d_F^2 = 2$$

$$d_F = 1.414 \text{ in.}$$

$$.7854 d_G^2 - .7854 (d_D)^2 = .7854 (d_D)^2$$

$$d_G^2 = 2(1.13)^2$$

$$d_G = 1.600 \text{ in.}$$

In general the spacing between the chamber nozzle section 20 and the wall of the diffuser section 13 will be $(.707)d$, hence:

(2) $(.707)(1.22) = d_H = 1.72$ in.
(2) $(.707)(1.35) = d_I = 1.90$ in.
(2) $(.707)(1.50) = d_J = 2.12$ in.

The efficiency of separation may be expressed as the net mass of condensate collected in chamber $3(W_3)$ divided by the mass of condensate flowing across section $2'$ $(W_{2'})$ (FIG. 2), both masses being based on a unit time basis, or $W_3/W_{2'}$. Thus, the efficiency may be calculated by the formula $$\frac{W_3}{W_{2'}} = \frac{D^2}{(D + 2L \tan \delta)^2}$$

where D is the diameter of the inlet nozzle outlet 1A, and L is the spacing between the outlet 1A and the outlet nozzle inlet 4. Both $W_3$ and $W_{2'}$ may be readily ascertained by known methods.

In conclusion, the following main design parameters were found to be required to obtain the highest degree of efficiency for the separator 10. The nozzles 11 and 12 should be of the same size shape and configuration, axially aligned and opposed as illustrated. The nozzles 11 and 12 and their respective discharge and inlet openings 1A and 4 can be of any transverse cross-sectional configuration as long as they are substantially identical. The less identical, the less the efficiency.

The distance between discharge or outlet opening 1A and the inlet opening 4 is a function of the maintenance of the parameter wherein, for a given inlet pressure of a fluid at cross section 1, the exhaust pressure of the fluid at the cross section 1A should be equal to or greater than the critical pressure for the particular fluid flowing therethrough. Under these conditions, $P_2$ is equal to $P_{1A}$. Putting it another way, the pressure ratio $P_{1A}/P_1$ should be greater than or equal to the calculated critical pressure ratio for the fluid.

By maintaining these conditions, in the preceding efficiency formula, the angle $\delta$ is equal to zero. And where the angle of divergence is equal to zero, the theoretical efficiency of the separator is 100% as the entire discharge jet from the inlet nozzle 11 is directed toward the inlet 4 to the chamber 3. Thus, all particles of the higher density would be directed into and be collected by for subsequent removal from the collecting chamber.

Figure 5:
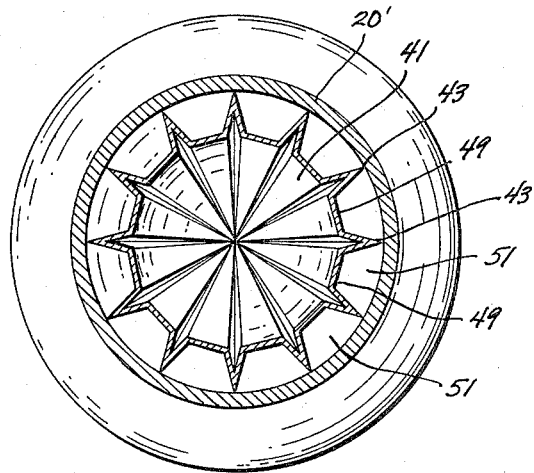
FIG. 5 is an enlarged sectional view taken along the line 5—5 in FIG. 4.

Referring now to FIGS. 4 and 5, a modification of the Zero-G separator of FIG. 1 and the earth environment separator of FIG. 2 is disclosed, being indicated generally at 10'. Like elements to the separator of FIG. 1 are indicated by the same reference numerals, plus the addition of a prime.

Within the collection chamber nozzle 12' a tapered insert 41 is mounted. The insert 41 is shown as having a pointed forward end 42 disposed on the longitudinal axis of the separator 10'. Flowing rearwardly from the forward end 42, the insert 41 is of a generally cylindrical shape with a plurality of equidistant, arcuately spaced, inverted V-shaped ridges 43 formed in the outer peripheral wall surface of the insert 41. The forward portion 44 diverges concentrically outwardly toward the chamber section 20', and the main intermediate portion 46 of the insert 41 extends with the outer edges of its ridges 43 complementary to and in mating engagement with the inner surface of the chamber section 20'. It will be appreciated that one of the functions of the main portion ridges 43 is to secure and to center and align the insert 41 within the chamber section 20'.

The rear portion 47 of the insert curves in a diverging manner complementarily with the rear end 22' of the chamber section 20', ending in a tapered rear end 48 axially aligned with the forward end 42. The rear end is directly in front of the open center 23' of the chamber rear end 22' which fluidly communicates with the reservoir 32' by a conduit 38'.

In use of the insert 41 (FIGS. 4 and 5), as the condensate enters the collecting chamber 3' the incoming particles impinge on the outer surface 49 (FIG. 5) of the insert 41 and are directed rearwardly and between the ridges 43 in the passages 51 formed therebetween. At the rear end 48 of the insert 41, the particles are introduced into the conduit 38' for transmission to the reservoir 32'.

The radial spacing between the surface 49 of the insert, and the inner surface of the section 20', and the number and radial height of the ridges 43 is dependent upon the particle flow rate upon being separated from the fluid and removed from the collecting chamber 3'. The net flow area is derived from:

$$m_p = A_{net} V_p$$

where:

$m_p$ = mass flow rate of particle.
$A_{net}$ = net flow area.
$V_p$ = velocity of particle through net flow area.

The velocity ($V_p$) of the particle being removed is a variable and is fixed by the desired hydrostatic pressure head in the insert passages 51, or on the conduit opening 23'.

The principle of hydrostatic head recovery and the resultant pressure head being developed for use in expulsion of the particle through the conduit 38' is as follows. High velocity particles enter the collecting chamber nozzle 12' and strike the forward end 42 of the insert 41. Due to the taper of the insert 41, the particles continue traveling along the insert and rearwardly through the passages 51 and between the ridges 43. The velocity head of the particles is greatly reduced while the pressure head is increased according to the law:

$$\frac{V_{pi}^2}{2g_c} = \frac{P_{pp}}{\rho_p} + \frac{V_p^2}{2g_c}$$

Where:

$\frac{V_{pi}}{2g_c}$=Velocity head of entering particle upon striking insert 41.

$\rho_p$=Density of particle.

$P_{pp}$=Hydrostatic head developed in the insert net flow area passage.

$\frac{V_p^2}{2g_c}$=Velocity head developed in the insert net flow passage.

Thus, by proper tapering of the insert 41, and by proper sizing of the net flow area passages 51, any desired hydrostatic head and velocity head can be maintained in the insert net flow total passage area. In the actual application, it will be desired to maintain a high pressure head and a low velocity head in that area on each particle.

One of the key features of this means for fluid collecting and directing is that the incoming particle velocity head is converted to any other desired velocity head and pressure head by proper design of the insert 41. The parameters which control the proper insert design are: (a) mass flow rate of the particle entering the collecting chamber nozzle 12′, and (b) the desired hydrostatic pressure head to be developed in the insert net flow area passage.

In summation as to the embodiment of FIGS. 4 and 5, the separator 10′ disclosed and described therein is usable in either a Zero-G or a non-Zero-G environment and includes an insert 41 secured within chamber section 20 and the rear end 22 thereof having a shape complementary to the nozzle 12′, and with a plurality of ridges 43 which act to space the surface 49 of the insert from the interior of the nozzle 12′. The ridges 43 act further to form passages which function as capillary tubes in a Zero-G environment.

Some changes may be made in the construction and arrangement of my means for separating particles of high density from fluid of low density without departing from the real spirit and purpose of my invention, and it is my intention to cover by my claims, any modified forms of structure or use of mechanical equivalents which may be reasonably included within their scope.

I claim:

1. An apparatus for separating particles of a relatively high density from a fluid of low density in which the particles are entrained comprising in combination:

first nozzle chamber means having a constant diameter tubular section and a first substantially frusto-conical nozzle section with a progressively decreasing diameter ending at a circular discharge opening at the smaller diameter end thereof;

second nozzle chamber means disposed downstream from said first nozzle means, said second nozzle means having a second substantially frusto-conical nozzle section identical to said first nozzle section, reversed so as to face said first nozzle section, and wherein said second nozzle section inlet opening has a diameter substantially identical to said discharge opening, said sections substantially co-axially aligned and spaced apart a distance less than their lengths, and a semi-circularly formed rear end member attached to and normally closing the larger diameter end of said second nozzle means from the atmosphere;

means fluidally connected to said second nozzle chamber means rear end member and capable of withdrawing particles of low density from said second nozzle chamber means; and diffuser means including a hollow frusto-conical section a small circular end of which mates with and is connected to said discharge end of said first nozzle section, and which frusto-conical section completely surrounds said second nozzle section so as to form a chamber thereabout and extends downstream from said connection with a progressively increasing diameter concentric with said second nozzle section to a larger diameter terminal end past said second nozzle section, a second frusto-conical section having its larger diameter end connected to said first section larger diameter terminal end, and its smaller diameter end connected to a tubular section having an internal diameter substantially identical to the internal diameter of said first nozzle tubular section whereby the pressure of the diverted fluid is recovered to a value substantially equal to the pressure in said constant diameter section of said first nozzle means.

2. An apparatus for separating particles of a relatively high density from a fluid of low density in which the particles are entrained comprising in combination:

first nozzle chamber means having a constant diameter tubular section and a first substantially frusto-conical nozzle section with a progressively decreasing diameter ending at a circular discharge opening at the smaller diameter end thereof;

second nozzle chamber means disposed downstream from said first nozzle means, said second nozzle means having a second nozzle section identical to said first nozzle section, reversed so as to face said first nozzle section, and wherein said second nozzle section smaller diameter end forms an inlet opening, said sections axially aligned and spaced apart a distance less than their lengths, normally closing means for normally closing the rear interior of said second nozzle section from the atmosphere;

means fluidally connected to said second nozzle chamber means and capable of withdrawing particles of low density therefrom; said fluidally connected means including a pad of porous, fibrous material affixed to said normally closing means in the rear interior of said second nozzle section, and a capillary tube network interposed throughout said pad and leading externally of said second nozzle section; and means having a first substantially frusto-conical section the smaller circular end of which mates with and is connected to said discharge end of said first nozzle section, and which substantially frusto-conical section surrounds so as to form a chamber thereabout said second nozzle section and extends away from said connection with a progressively increasing diameter until past said second nozzle section and terminating in a larger diameter end, a second substantially frusto-conical section with its larger diameter end connected to the larger diameter end of said first substantially frusto-conical section and its smaller diameter end connected to a tubular section extended from said second nozzle section in a direction opposite from said first nozzle section.

3. An apparatus for separating particles of a relatively high density from a fluid of low density in which the particles are entrained comprising in combination:

first nozzle means having a discharge opening through which the fluid is discharged at a predetermined mass flow rate wherein the fluid has a first pressure and a first velocity, the particles being discharged at a momentum greater than the momentum of the fluid;

second nozzle means disposed downstream from said first nozzle means, said second nozzle means having an inlet opening spaced from and axially aligned with said discharge opening and having a chamber formed therein behind said inlet opening into which the fluid flows, said second nozzle means chamber arranged fo building up a fluid pressure therein sufficient to divert the fluid flow away from said inlet opening at a second velocity, said pressure when multiplied times the area of said inlet opening being a force equal to said fluid mass flow rate times the net difference between said first velocity and said second velocity, said force acting on a unit volume of the fluid being insufficient relative to said particles' momentum to divert the particles from entering said chamber to collect therein;

means secured to said first nozzle means and surrounding, so as to form a chamber thereabout, said second nozzle means and the space between said discharge opening and said inlet opening for transmitting said diverted fluid away from said second nozzle means, said surrounding means recovering the pressure of said diverted fluid to a value substantially equal to said first pressure thereof; and means inserted within said chamber for directing the particles entering said chamber rearwardly thereof while simultaneously reducing the velocity head of said particles and increasing the pressure head thereof.

4. An apparatus for separating particles of a relatively high density from a fluid of low density in which the particles are entrained comprising in combination:

first nozzle means having a discharge opening through which the fluid is discharged at a predetermined mass flow rate wherein the fluid has a first pressure and a first velocity, the particles being discharged at a momentum greater than the momentum of the fluid;

second nozzle means disposed downstream from said first nozzle means, said second nozzle means having an inlet opening spaced from and axially aligned with said discharge opening and having a chamber behind said inlet opening into which the fluid flows, said second nozzle means chamber arranged for building up a fluid pressure therein sufficient to divert the fluid flow away from said inlet opening at a second velocity, said pressure when multiplied times the area of said inlet opening being a force equal to said fluid mass flow rate times the net difference between said first velocity and said second velocity, said force acting on a unit volume of the fluid being insufficient relative to said particles' momentum to divert the particles from entering said chamber to collect therein;

means for withdrawing from the chamber the particles collected therein, said withdrawing means including a pad of porous, fibrous material affixed to the rear interior of said second nozzle section, and a capillary tube network interposed throughout said pad and leading externally of said second nozzle section; and means secured to said first nozzle means so as to form a chamber thereabout and having a substantially frusto-conical section the smaller circular end of which is of an identical configuration with the discharge end of said first nozzle section, and which is contiguous therewith, and which substantially frusto-conical section surrounds said second nozzle section and extends away from said connection with a progressively increasing diameter and terminating past said second nozzle section in a larger diameter end, a second substantially frusto-conical section with its larger diameter end connected to the larger diameter end of said first substantially frusto-conical section and its smaller diameter end connected to a tubular section extended from said second nozzle section in a direction opposite from said first nozzle section.

References Cited by the Examiner

UNITED STATES PATENTS

| | | | |
|---|---|---|---|
| 485,915 | 11/1892 | Duckham | 55—17 |
| 2,289,474 | 7/1942 | Anderson | 55—393 |
| 2,372,316 | 3/1945 | Curtis | 55—342 |
| 2,474,017 | 6/1949 | Smith et al. | 55—301 |
| 2,580,655 | 1/1952 | Chipley | 55—423 |
| 2,607,439 | 8/1952 | Dickens et al. | 55—17 |
| 2,946,399 | 7/1960 | Manteufel | 55—17 |
| 2,951,554 | 9/1960 | Becker | 55—17 |
| 3,001,402 | 9/1961 | Koblin | 55—423 |
| 3,019,853 | 2/1962 | Kohman et al. | 55—16 |

FOREIGN PATENTS

| | | |
|---|---|---|
| 1,258,461 | 3/1961 | France. |
| 358,394 | 9/1922 | Germany. |
| 794,834 | 5/1958 | Great Britain. |

REUBEN FRIEDMAN, *Primary Examiner.*

D. TALBERT, *Assistant Examiner.*